United States Patent [19]

Fanti et al.

[11] Patent Number: 4,718,515

[45] Date of Patent: Jan. 12, 1988

[54] CONTROL DEVICE FOR A VEHICLE WITH DISENGAGEABLE FOUR-WHEEL DRIVE

[75] Inventors: Cristoforo Fanti, Milan; Gianclaudio Travaglio, Arese; Luciano Ferrario, Rho; Saverio Moscatelli, Milan, all of Italy

[73] Assignee: Alfa Romeo Auto S.p.A., Naples, Italy

[21] Appl. No.: 892,366

[22] Filed: Aug. 4, 1986

[30] Foreign Application Priority Data

Aug. 6, 1985 [IT] Italy ............................... 21872 A/85

[51] Int. Cl.⁴ ...................... B60K 23/08; B60K 17/34
[52] U.S. Cl. ................................... 180/233; 364/424.1
[58] Field of Search ............... 180/247, 233, 250, 249, 180/248; 364/424.1

[56] References Cited

U.S. PATENT DOCUMENTS

| | | | |
|---|---|---|---|
| 4,417,641 | 11/1983 | Kageyama | 180/247 |
| 4,617,840 | 10/1986 | Yamakawa et al. | 180/247 |

FOREIGN PATENT DOCUMENTS

| | | | |
|---|---|---|---|
| 0049961 | 4/1985 | European Pat. Off. | 180/233 |
| 20880975 | 6/1982 | United Kingdom | 180/247 |
| 2118267 | 10/1983 | United Kingdom | 180/233 |
| 2132303 | 7/1984 | United Kingdom | 180/233 |

OTHER PUBLICATIONS

Japanese Patent Abstract, vol. 7, No. 237, (M-250), dated Oct. 21, 1983.

Primary Examiner—John A. Pekar
Attorney, Agent, or Firm—Charles E. Brown; Charles A. Brown

[57] ABSTRACT

A control device for a vehicle with a disengageable four-wheel drive which has two differentials. The control device has a number of sensor means and a comparator means by which the speed of the vehicle; position of the accelerator and brake pedals; and a predetermined value are compared. In response to the comparison, the control device selectively and automatically engages and disengages the vehicle's four-wheel drive mode.

6 Claims, 3 Drawing Figures

CONTROL DEVICE FOR A VEHICLE WITH DISENGAGEABLE FOUR-WHEEL DRIVE

This invention relates to a control device for a vehicle with a disengageable four-wheel drive comprising two differentials, and in particular a control device for the automatic engagement and disengagement of the four-wheel drive as an alternative to single-axle (two-wheel) drive, according to the vehicle running conditions. Under numerous running conditions, four-wheel drive vehicles are known to perform better than two-wheel drive vehicles, for equal static and dynamic load distribution.

For example, during acceleration while travelling in a straight line or while turning, both on dry ground and, particularly, on wet or snow-covered ground, four-wheel drive vehicles are able to transmit greater power because they can utilise all the available road adhesion, by being able to distribute traction to all four wheels. Thus for equal lateral acceleration, four-wheel drive vehicles allow much higher longitudinal acceleration than two-wheel drive vehicles, for any type of road surface.

In particular, four-wheel drive vehicles with two differentials give the best absolute performance in straight-line driving, not only during acceleration but also during braking, because the distribution of traction and braking forces can adapt to the static and dynamic load distribution on the front and rear wheel groups, and thus allow optimum utilisation of the available road adhesion. In contrast, in four-wheel drive vehicles with three differentials, the traction and braking distribution is fixed beforehand at the design stage, and cannot follow the dynamic load variations. Consequently, locking of the third differential is used.

It is during sudden braking and partly during acceleration that vehicles with two diferentials can be penalised because of the fact that the front and rear wheel groups are rigidly connected together and the third differential, which serves for eliminating kinematic incompatibilities, is missing. Under these conditions, the two wheel groups can slip or simultaneously lock.

In turning at low speed, vehicles with two differentials can present difficulties, because the wheels of the front and rear wheel groups travel through trajectories of different radii of curvature, and therefore have different speeds. In particular, the rear wheels, which travel through trajectories of smaller radii of curvature, have a higher speed than the front wheels, which follow trajectories of a greater radius. The result is an effect of one wheel group dragging the other because of the rigid connection.

The greatest problems are encountered during acceleration through very sharp bends, and particularly when starting with a wide steering angle on a road surface with a high coefficient of adhesion, where the effects of locking between the front and rear wheel groups can lead to sudden stoppage of the vehicle.

In four-wheel drive vehicles with two differentials, the output shaft of the change-speed gearbox is operationally connected to the two differentials of the front and rear wheel groups, and where the four-wheel drive can be disengaged in order to pass to two-wheel drive, a separable connection is interposed between the output shaft of the gearbox and one of the differentials, and is either manually operated or automatically operated in dependency on certain vehicle operating parameters, such as that described in U.S. Pat. No. 4,417,641.

These known constructions are however either inadequate such as those operated manually, or only partly satisfactory such as the aforesaid automatically operated one, the action of which is limited to only some of the critical operating conditions.

The object of the present invention is a control device which obviates the limitations of known constructions, and which is capable of operating with maximum efficiency and reliability under all those conditions in which passage from four-wheel drive to two-wheel drive and vice versa is required or is in any event advisable.

The control device according to the invention is particularly suitable for a four-wheel drive vehicle in which one wheel group is always engaged, the output shaft of the change-speed gearbox being connected permanently to the differential of said wheel group and being connected selectively to the differential of the other wheel group by separable connection means and relative actuator means, said control device comprising vehicle speed sensor means operationally connected to a control unit comprising comparator means arranged to compare the vehicle speed signal with predetermined limiting values to establish whether they are greater or less than said limiting values, and to provide signals indicative of the result of the comprison, said control unit being operationally connected to said actuator means, the device being characterised by also comprising means for sensing the position of the accelerator pedal, said comparator means being also able to compare the accelerator pedal position signal with a predetermined limiting value to establish whether it is greater or less than said limiting value, and to provide signals indicative of the results of the comparison, said control unit also comprising logical operation means able to feed to said actuator means first signals for causing said connection means to disconnect the differential of said other wheel group from the gearbox output shaft should the speed be less than and the accelerator pedal position be less than the respective limiting values, and second signals for causing said connection means to make the said differential rigid with the gearbox output shaft should the speed be less than and the accelerator pedal position be greater than the respective limiting value, or should the speed to greater than the respective predetermined limit.

By this means the device leaves the four-wheel drive disengaged when the vehicle runs at low speed with the accelerator pedal slightly lowered, so that transmission locking is prevented during sharp turning as only the wheels of one axle are driven.

According to a preferred embodiment, said speed sensor means are means for measuring the respective rotational speed of the wheels of that wheel group always engaged, and the control device is characterised by also comprising means for sensing the position of the brake pedal and means for sensing the commencement of travel of the accelerator pedal, these also being operationally connected to said control unit, said control unit also comprising processor means arranged to obtain from the signals of said wheel speed measuring means signals indicative of the speed variations and of the direction of said variations in order to distinguish acceleration from deceleration, said comparator means being also able, in the presence of the signal indicating that the travel of the accelerator pedal has commenced, to compare the acceleration signals with a predetermined limiting value to establish whether these are greater or less than said limiting value and to provide signals indicative of the results of the comparison, said logical operation means also being able to exclude said first signals and to feed to said actuator means said second control signals for causing said connection means to make said differential rigid with the gearbox output shaft should the acceleration exceed the predetermined limit, said comparator means being further able, in the presence of the signal indicating operation of the brake pedal, to compare the deceleration signals with a predetermined limiting value to establish whether they are greater or less than said limiting value and to provide signals indicative of the results of the comparison, said logical operation means being able to exclude said second signals and able to feed said first signals to said actuator means in order to cause said connection means to disconnect the differential of said other wheel group from the gearbox output shaft, even at a speed exceeding said limiting value, should the deceleration be greater than the respective limiting value. With this embodiment of the device, if the wheels slip due to excessive acceleration, especially on starting the vehicle on poorly adhering ground, four-wheel drive is restored in order to best utilise the available adhesion, even if the vehicle speed and the accelerator position are less than the respective limits for engagement of four-wheel drive.

Again with this embodiment, if the wheels slip due to excessive deceleration brought on by too heavy braking, especially on poorly adhering ground, the device disengages the four-wheel drive to pass to two-wheel drive, so as to prevent locking of the four wheels and to allow the rear wheel group to recover its adhesion, even if the vehicle speed at the commencement of braking exceeds the limit for engagement of the four-wheel drive.

Characteristics and advantages of the invention are illustrated hereinafter with reference to the accompanying FIGS. 1 to 3, which show a preferred embodiment of the invention by way of non-limiting example.

In FIG. 1, the transmission is shown partly in section and the control device is illustrated by a block diagram;

Figure 1:
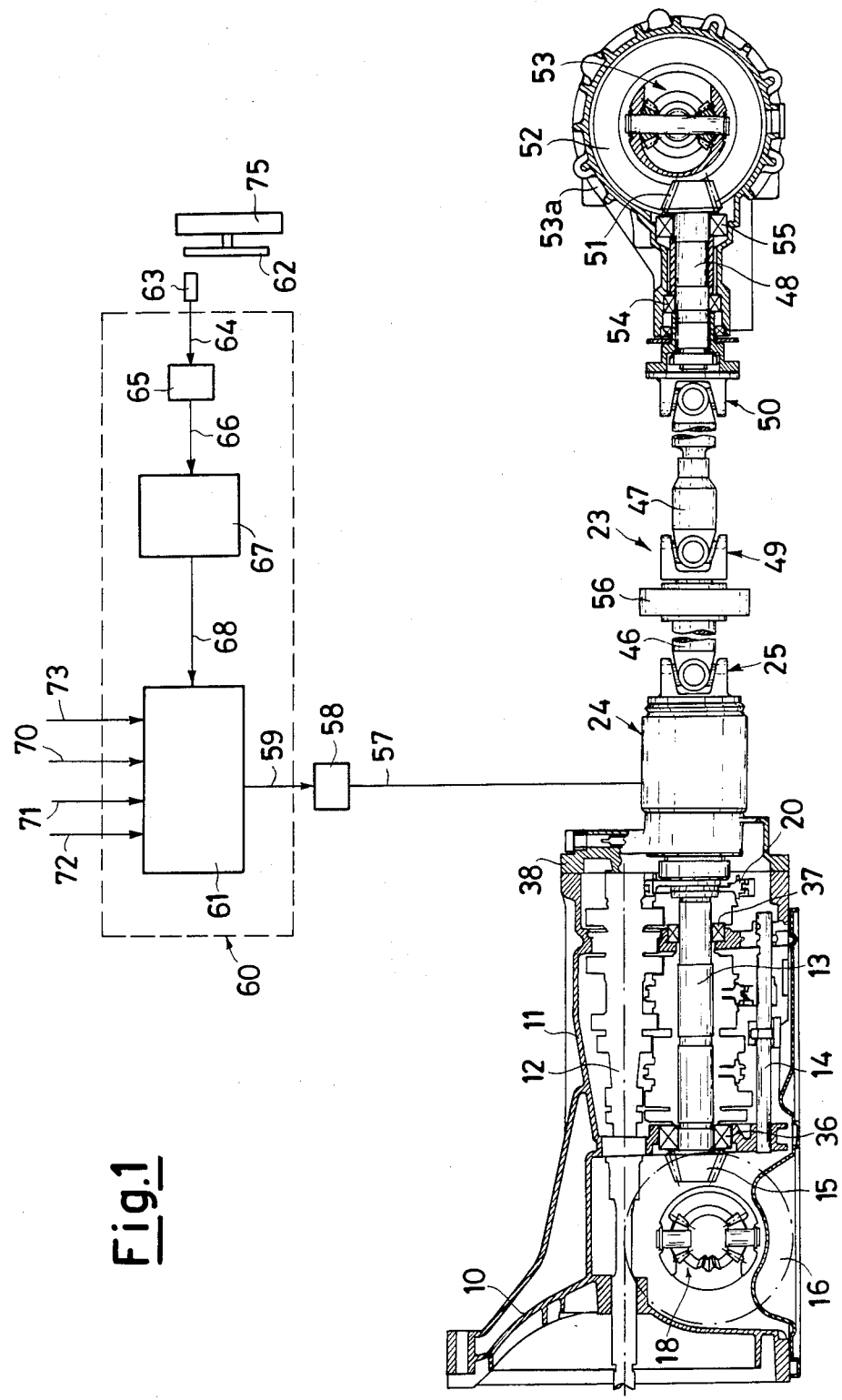

In FIG. 1, the reference numeral 10 indicates the bellhousing of the friction clutch, not shown, and 11 the gearbox casing. The main shaft, indicated by 12, and transmission shaft, indicated by 13, are visible. Also shown is one of the rods 14 which are operated by the gear level for engaging the various transmission ratios.

The bevel pinion 15 is rigid with the shaft 13 and engages the ring gear 16 of a differential indicated overall by 18. In this specific case, the differential 18 transmits motion to the wheels of the front axle, and they are therefore always engaged.

Figures 2, 3:
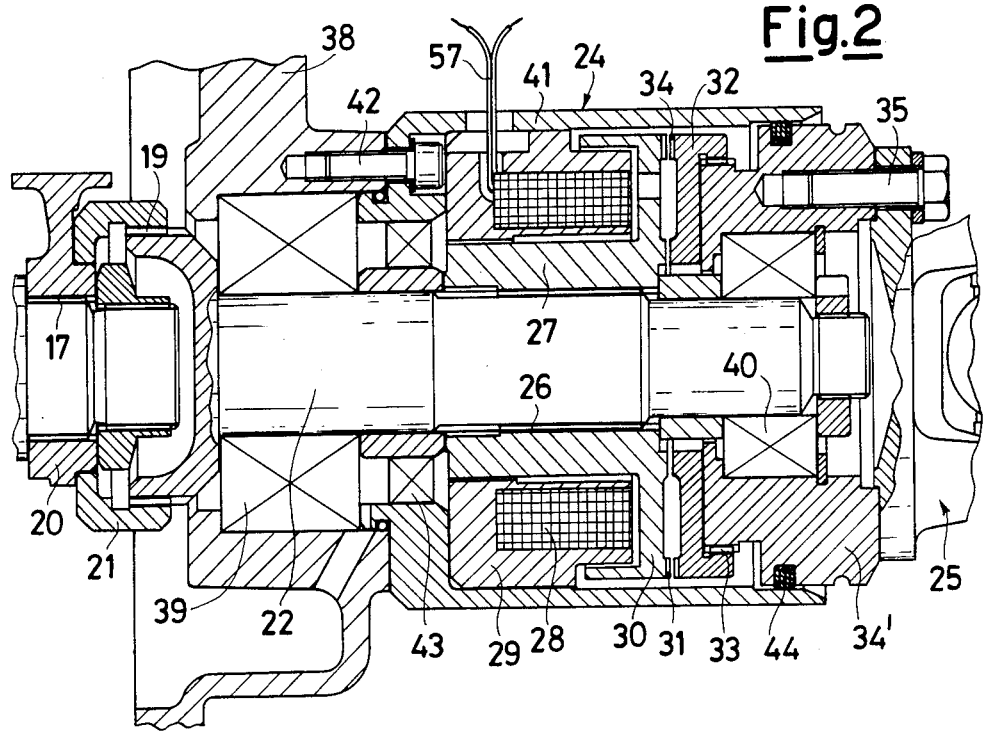
FIG. 2 is an enlarged view of a detail of FIG. 1.
FIG. 3 shows a modified embodiment of the device of FIG. 1.

The shaft 13 is connected by the keys 17 and 19 to the hub 20, ring nut 21 and shaft 22, this latter being connected to the drive shaft 23 by an electromagnetic clutch, indicated overall by 24 and shown in detail in FIG. 2, and a universal joint 25. The shaft 22 is connected by the key 26 to the core 27 of a coil 28, its holder being indicated by 29. A pulley 30 provided with a peripheral ring of frontal teeth 31 is rigid with the core 27, and in front of the pulley 30 there is disposed a disc 32 which forms the armature of the coil 28, and is also provided with a peripheral ring of frontal teeth 34.

The disc 32 is axially mobile, being connected by the key 33 to the flange 34', this latter being fixed by the screw 35 to a spider of the universal joint 25.

The figures also show the bearings 36 and 37 of the shaft 13, the cover 38 of the gearbox casing 11, the bearings 39 and 40 of the shaft 22, the casing 41 of the electromagnetic clutch 24 fixed to the cover 38 by the screws 42, and the seal rings 43 and 44.

In FIG. 1, the reference numeral 46 indicates the first portion, 47 the second portion and 48 the third portion of the drive shaft 23. The reference numeral 56 indicates the intermediate support for said shaft and 49 and 50 indicate the universal joints which connect together the three shaft portions.

The end portion 48 of the drive shaft is rigid with the pinion 51, which engages the ring gear 52 of the differential, indicated overall by 53 and connectd to the wheels of the rear axle.

The figure also shows the bearings 54 and 55 of the third portion 48 of the shaft 23, and the rear axle casing 53a.

The coil 28 of the electromagnetic clutch 24 is connected by the lead 57 to the power stage 58 of the control device, indicated overall by 60.

The power stage 58 is connected by the line 59 to the output unit of a microcomputer indicated by 61. FIG. 1 shows diagrammatically a tachometer wheel 62 which is rigid with the axle of a vehicle wheel 75. The wheel 62 is provided with peripheral notches, which during wheel rotation are sensed by a sensor indicated by 63 and connected by the line 64 to a squaring and amplifying stage 65 for the pulse signals supplied by said sensor.

The output signals from the stage 65 are fed through the line 66 to a phase locked loop (PLL) comparator stage 67, which is able to supply a signal proportional to the speed of a vehicle wheel. the output signals from the stage 67 are fed through the lines 68 to the input unit of the microcomputer 61, which also receives the signals 70 and 71, provided by switches, not shown, connected respectively to the clutch pedal and to the gear control rod of the gearbox. The said microcomputer 61 also receives a signal 72 originating from a sensor, not shown, for sensing the accelerator pedal position, and a signal 73 provided by a switch, not shown, which can be operated manually in order to cut out the automatic operation of the device and cause the electromagnetic clutch 24 to permanently engage four-wheel drive, for example if starting on poorly adhering ground. During automatic operation of the device, the pulse signals emitted by the sensor 63 are processed in the comparator stage 67 in order to obtain from them the speed signals for the wheel 75, which are then fed to the microcomputer 61.

The microcomputer 61 is programmed to execute the operational sequences scheduled for controlling the engagement and disengagement of the electromagnetic clutch 24.

The microcomputer 61 thus receives the accelerator pedal position signal 72 and compares it with a predetermined limiting value to establish whether it is less or greater than this, and to emit a signal indicative of the result of the comparison.

The microcomputer 61 also compares the speed signals of the wheel 75 with predetermined limiting values, namely a first limit if the vehicle speed is increasing, and a second limit, slightly lower than the first, if the vehicle speed is decreasing, and emits signals indicative of the results of the comparison.

From the signals 70 and 71 originating from the clutch pedal and gear control rod of the gearbox, the mirocomputer also determines whether the friction clutch is engaged or not, and whether the gearbox is in neutral or not, to prevent the four-wheel drive becoming engaged and disengaged while the vehicle is at rest, due to operation of the accelerator pedal.

If the clutch is disengaged and the gearbox is not in neutral, and it is determined that the accelerator pedal position and the vehicle speed are less than the limiting values, the microcomputer feeds to the power stage 58 a control signal for de-energising the coil 28 of the electromagnetic clutch 24, to leave the drive shaft 23 and the rear axle wheels disengaged from the gearbox shaft 13, so that the vehicle runs with two-wheel drive.

If however the vehicle speed is found to be less than the predetermined limit and the accelerator pedal position exceeds the respective limit, or if the vehicle speed is greater than the respective limit, the microcomputer feeds to the power stage 58 a control signal for energising the coil 28 of the electromagnetic clutch 24, which attracts the disc 32 and, by the engagement of the toothing 31 and 34, makes the drive shaft 23 and rear axle wheels also rigid with the shaft 13, so engaging the four-wheel drive.

Thus under normal conditions the vehicle starts with two-wheel drive on the front wheels, so preventing the transmission locking which would occur with wheels subjected to sharp turning on high adhesion ground.

In the modified embodiment of the device shown in FIG. 3, the same reference numerals as in FIG. 1 are used for indicating common components.

FIG. 3 shows diagrammatically the vehicle front wheels 75 and 76, with which respective tachometer wheels 77 and 78 provided with peripheral notches are rigid. The reference numerals 79 and 80 indicate sensors operationally associated with the wheels 77 and 78, and the reference numerals 81 and 82 indicate the squaring and amplifying stages for the pulse signals arriving from the sensors 79 and 80 through the lines 83 and 84.

The output signals from the squaring stages are fed through the lines 85 and 86 to the phase locked loop (PLL) comparator stages 87 and 88.

The comparator stages (PLL) 87 and 88 are able to supply, through the lines 89, 90, 91, 92, signals proportional to the speed of the wheels 75 and 76, and window signals proportional to the variations in speed, acceleration and deceleration.

The microcomputer 61 also receives the signals 69, 70, 71 provided by switches, not shown, connected respectively to the brake pedal, the clutch pedal and the gear control rod of the gearbox.

The said microcomputer also receives the signals 72 and 72a originating one from a sensor, not shown, for sensing the accelerator pedal position, and the other from a sensor for sensing the commencement of travel of the accelerator pedal. A counter 95 is also connected to the microcomputer 61 by the lines 93 and 94. In this case the signal 73 from the manual switch of FIG. 1 is missing, because the device is completely automatic.

During operation of the device, the signals originating from the lines 89, 90, 91, 92 are processed by the microcomputer 61 with the aid of the counter 95, to determine the speed signals and the acceleration or deceleration signals for the vehicle wheels.

Again in this case the microcomputer 61 is programmed to execute the operational sequences scheduled for controlling the engagement and disengagement of the electromagnetic clutch 24.

As stated, the microcomputer 61 processes not only the speed signals for the wheels (89 and 90), but also the signals relating to the variation in speed, acceleration or deceleration (91 and 92), should the vehicle be accelerating or decelerating.

The microcomputer 61 also compares these signals with predetermined limiting speed and acceleration or deceleration values, and emits signals indicative of the results of the comparison.

The microcomputer 61 compares the speed variation signals with the limiting deceleration value, if simultaneously it receives the signal 69 from the brake pedal, and compares the same signals with the limiting acceleration value if simultaneously it receives the signal 72a indicating commencement of the accelerator pedal travel. In this case the microcomputer 61 carries out the same checks and takes the same action as the device of FIG. 1.

However if with the brake pedal at rest, the accelerator pressed less than the respective limit and the speed also less than the respective limit the microcomputer 61 calculates that the acceleration of one or both of the wheels 75 and 76 is greater than the predetermined limiting value, it feeds to the power stage 58 a command signal for energising the coil 28 of the electromagnetic clutch 24, so engaging the toothing 31 and 34 of said clutch, so as to engage the four-wheel drive and prevent slipping of the wheels especially on low adhesion ground.

However if with the four-wheel drive engaged the microcomputer 61 receives a brake pedal operation signal from the line 69 and also verifies that the deceleration of the wheels 75 and 76 is greater than the predetermined limiting value, it feeds to the stage 58 a command signal for de-energising the coil 28 of the electromagnetic clutch 24, to disengage the four-wheel drive and thus run with two-wheel drive.

This thus prevents simultaneous locking of the four wheels of the vehicle in the case of too heavy braking on low adhesion ground. According to a further modification of the device of FIG. 1, the microcomputer 61 could be fed with a signal originating from a switch connected to the brake pedal, such as the signal 69 of FIG. 2, to disengage the four-wheel drive at the moment of operation of the said brake pedal, in order to prevent locking of the four wheels in the case of too heavy braking.

What is claimed is:

1. A control device particularly for a four-wheel drive vehicle in which one wheel group is always engaged, the output shaft of the change-speed gearbox being connected permanently to the differential of said one wheel group and being connectable selectively to the differential of the other wheel group by separable connection means and actuator means, said control device comprising vahicle speed sensor means operationally connected to a control unit comprising comparator means arranged to compare the vehicle speed signal with predetermined limiting values to establish whether they are greater or less than said limiting values and to provide signals indicative of the results of the comparison, said control unit being operationally connected to said actuator means, said control device also comprising means for sensing the position of the accelerator pedal, said comparator means being also able to compare the accelerator pedal position signal with a predetermined limiting value to establish whether it is greater or less than said limiting value and to provide signals indicative of the comparison, said control unit also comprising logical operation means in cooperation with said comparator means and responsive to said signals is able to feed to said actuator means first signals for causing said connection means to disconnect the differential of said other wheel group from the change-speed gearbox output shaft should the speed be less than and the accelerator pedal position be less than the respective limiting values, and second signals for causing said connection means to connect said differential of said other wheel group with the change-speed gearbox output shaft should the speed be less than and the accelerator pedal position exceed the respective limiting value, or should the speed alone be greater than the respective predetermined limit.

2. A control device as claimed in claim 1, wherein said speed sensor means are means for measuring the respective rotational speed of the wheels of said one wheel group which is always engaged, said control device being characterised by also comprising means for sensing the position of the brake pedal and means for sensing the commencement of travel of the accelerator pedal, these also being operationally connected to said control unit, said control unit also comprising processor means arranged to obtain from the signals of said wheel speed measuring means signals indicative of the speed variations and of the direction of said variations in order to distinguish acceleration from deceleration, said comparator means being also able, in the presence of the signal indicating that the travel of the accelerator pedal has commenced, to compare the acceleration signals with a predetermined limiting value to establish whether they are greater or less than said limiting value and to provide signals indicative of the results of the comparison, said logical operation means also being able to exclude said first signals and being able to feed to said actuator means said second control signals for causing said connection means to connect the differential of said other wheel group with the change-speed gearbox output shaft should the acceleration exceed the predetermined limit, said comparator means being further able, in the presence of the signal indicating operation of the brake pedal, to compare th deceleration signals with a predetermined limiting value to establish whether they are greater or less than said limiting value and to provide signals indicative of the results of the comparison, said logical operation means being able to exclude said second control signals and being able to feed said first signals to said actuator means in order to cause said connection means to disconnect the differential of said other wheel group from the change-speed gearbox output shaft, even at a speed exceeding said limiting value, should the deceleration be greater than the respective limiting value.

3. A control device as claimed in claim 1 or 2, characterised further comprising means for sensing the position of the clutch pedal and means for sensing the position of the gear control rod of the changespeed gearbox whereby signals are sent to said logical operation means indicating movement of the clutch pedal and the gear control rod and selectively engage or disengage the differential of said other wheel group.

4. A control device as claimed in claim 2, characterised in that said measuring means are able to provide pulse signals of frequency proportional to the speed of rotation of the wheels, and said processor means comprise phase lock loop (PLL) comparators able to provide signals proportional to the speed of the wheels and signals proportional to variations in the speed of said wheels.

5. A control device as claimed in claim 1, characterised by also comprising means for sensing the position of the brake pedal, said logical operation means being further able to feed said first signals to said actuator means in order to cause said connection means to disconnect the differential of said other wheel group from the gearbox output shaft in the presence of a signal indicating operation of the brake pedal.

6. A control device as claimed in claim 1, characterised in that said connection means and the relative actuator means are constituted by an electromagnetic clutch with a toothed coupling.

* * * * *